(12) United States Patent
Chuang et al.

(10) Patent No.: US 12,307,184 B1
(45) Date of Patent: May 20, 2025

(54) METHODS AND SYSTEMS FOR PREDICTING SILICON DENSITY FOR A METAL LAYER OF SEMI-CONDUCTOR CHIP VIA MACHINE LEARNING

(71) Applicant: ANSYS, Inc., Canonsburg, PA (US)

(72) Inventors: Wen-Tze Chuang, Yilan County (TW); Norman Chang, Fremont, CA (US); Lei Yin, San Jose, CA (US); Bolong Zhang, Tallahassee, FL (US); Xi Chen, Chengdu (CN); Jay Prakash Pathak, Pleasanton, CA (US); En Cih Yang, New Taipei (TW); Jimin Wen, Pleasanton, CA (US); Akhilesh Kumar, Milpitas, CA (US); Ming-Chih Shih, Taipei (TW); Ying Shiun Li, Pleasanton, CA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 18/371,331

(22) Filed: Sep. 21, 2023

Related U.S. Application Data

(63) Continuation of application No. 17/178,627, filed on Feb. 18, 2021, now Pat. No. 11,797,744.

(51) Int. Cl.
| | | |
|---|---|---|
| *G06F 30/392* | (2020.01) | |
| *G06N 3/04* | (2023.01) | |
| *G06N 3/08* | (2023.01) | |
| *G06F 111/10* | (2020.01) | |
| *G06F 119/18* | (2020.01) | |

(52) U.S. Cl.
CPC ............ *G06F 30/392* (2020.01); *G06N 3/04* (2013.01); *G06N 3/08* (2013.01); *G06F 2111/10* (2020.01); *G06F 2119/18* (2020.01)

(58) Field of Classification Search
CPC ............... G06F 30/392; G06F 2111/10; G06F 2119/18; G06N 3/04; G06N 3/08
See application file for complete search history.

(56) References Cited

U.S. PATENT DOCUMENTS

| | | | |
|---|---|---|---|
| 11,561,477 B2 * | 1/2023 | Su ........................... G06N 5/047 |
| 2020/0004921 A1 * | 1/2020 | Baidya .................. G06F 30/392 |
| 2022/0128899 A1 * | 4/2022 | Fujimura .................. G06N 3/04 |

* cited by examiner

*Primary Examiner* — Nghia M Doan
(74) *Attorney, Agent, or Firm* — Douglas A. Gastright

(57) ABSTRACT

A specification for a semi-conductor chip is received. The specification specifies a set of photomasks associated with a metal layer of the semi-conductor chip. Multiple portions of an area of the metal layer are identified. A respective image is generated for each portion of the area based on the photomasks. A respective drawn density of metal wires for each portion of the area is calculated. A trained machine learning model is invoked to predict a respective silicon density of metal wires for each respective portion of the area based on an image and a drawn density for the respective portion of the area. A silicon density for the area of the metal layer is calculated based on a combination of predicted silicon densities for the multiple portions of the area. The combination is based on an average value of the predicted silicon densities for the multiple portions of the area.

17 Claims, 16 Drawing Sheets

METHODS AND SYSTEMS FOR PREDICTING SILICON DENSITY FOR A METAL LAYER OF SEMI-CONDUCTOR CHIP VIA MACHINE LEARNING

CROSS-REFERENCE TO RELATED APPLICATIONS

This application is a continuation of U.S. application Ser. No. 17/178,627, entitled "METHODS AND SYSTEMS FOR PREDICTING SILICON DENSITY FOR A METAL LAYER OF SEMI-CONDUCTOR CHIP VIA MACHINE LEARNING", filed on Feb. 18, 2021, which is herein incorporated by reference in its entirety.

FIELD

The subject matter described herein relates to parasitic extraction of integrated circuits, more particularly to methods and systems for predicting a silicon density for a metal layer of a semi-conductor chip via machine learning (ML).

BACKGROUND

In electronic design automation, parasitic extraction is calculation of the parasitic effects in both the designed devices and the required wiring interconnects of an electronic circuit: parasitic capacitances, parasitic resistances and parasitic inductances, commonly called parasitic devices, parasitic components, or simply parasitics.

In early integrated circuits the impact of the wiring was negligible, and wires were not considered as electrical elements of the circuit. However below the 0.5-micrometer technology node resistance and capacitance of the metal wires started making a significant impact on circuit performance. With shrinking process technologies inductance effects of metals became important as well. Therefore, calculating a silicon density of the geometries for a metal layer is one of the key steps during on-chip parasitic extraction because it impacts local thickness and width of metal wires which directly affect the value of parasitic extraction.

Silicon density is defined as an estimated density of geometries in a metal layer including effects due to semiconductor chip fabrication/manufacturing processes, for example, etching process, chemical mechanical planarization (CMP) process, etc. Silicon density has been determined with a very time consuming simulation. It requires detailed etching calculations for the geometries including, for example, power/ground wires, signal wires, metal fills, etc. In general, etching calculations consume about 50%-60% of the total parasitic extraction runtime, which amounts to 20% or more increase of the runtime for including detailed silicon density calculations.

SUMMARY

Methods and systems are disclosed for predicting a silicon density for a metal layer of a semi-conductor chip via machine learning. In one aspect of the disclosure, a specification for a semi-conductor chip is received in a computer system. The specification specifies a set of photomasks associated with a metal layer of the semi-conductor chip. An image for a portion of the metal layer is generated based on the photomasks. Drawn density for the portion of the metal layer is calculated. Silicon density for the portion of the metal layer is determined based on the image in a simulation. A model is created for predicting the silicon density for the metal layer using the image and the drawn density via machine learning In still another aspect, the model for predicting a silicon density for a metal layer of a semi-conductor chip may contain a convolution neural network (CNN) followed by a deep neural network (DNN). CNN is used for generating image features. DNN receives the image features and drawn density to predict silicon density.

In still another aspect, a specification for a semi-conductor chip is received. The specification specifies a set of photomasks associated with a metal layer of the semi-conductor chip. Multiple portions of an area of the metal layer are identified. A respective image is generated for each portion of the area based on the photomasks. A respective drawn density of metal wires for each portion of the area is calculated. A trained machine learning model is invoked to predict a respective silicon density of metal wires for each respective portion of the area based on an image and a drawn density for the respective portion of the area. A silicon density for the area of the metal layer is calculated based on a combination of predicted silicon densities for the multiple portions of the area. The combination is based on an average value of the predicted silicon densities for the multiple portions of the area.

Non-transitory computer-readable medium (i.e., physically embodied computer program products) is described that stores instructions, which when executed by one or more data processors of one or more computing systems, cause at least one data processor to perform operations herein. Similarly, computer systems are described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

The details of one or more variations of the subject matter described herein are set forth in the accompanying drawings and the description below. Other features and advantages of the subject matter described herein will be apparent from the description and drawings, and from the claims.

DETAILED DESCRIPTION

The disclosure describes methods and systems for predicting a silicon density for a metal layer of a semiconductor chip via machine learning (ML). Each metal layer of the semi-conductor chip is partitioned into many areas (e.g., square tiles). Each area is further divided into multiple regions (e.g., square sub-tiles). An image (i.e., a two-dimensional image) can be generated for each region. The image covers a portion of the set of photomasks associated with the metal layer. The portion contains a region and a surrounding area of neighboring regions.

Input to the model can be the image, the drawn density and the numerical characteristics of metal wires for a region. Drawn density of the geometries (i.e., metal wires, metal fills, etc.) for the metal layer can be calculated. The numerical characteristics can include a number of statistical information, for example, minimum, average, standard deviation of metal wire widths and/or spacing for each of the photomasks.

Output of the model is a silicon density of the geometries for the metal layer. The model can contain a convolution neural network (CNN) followed by a deep learning network (DNN). The model can also contain only a DNN.

An integrated circuit (IC) or monolithic integrated circuit (also referred to as a chip, or a microchip) is a set of electronic circuits one small flat piece (or "chip") of semiconductor material that is normally silicon. Integrated circuit layout, also known as IC layout, or mask/photomask design, is the representation of an integrated circuit in terms of planar geometric shapes which correspond to the patterns of metal, oxide, or semiconductor layers that make up the components of the integrated circuit.

Figure 1A:
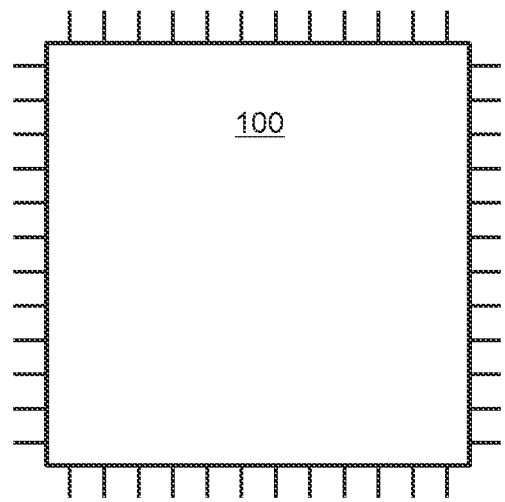
FIG. 1A is a diagram illustrating an example semiconductor chip.
Figure 1B:
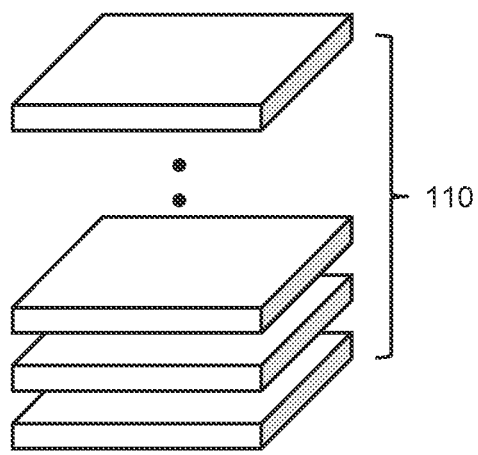
FIG. 1B is a diagram showing multiple metal layers of an example semi-conductor chip

FIG. 1A shows a simplified plan view of an example semi-conductor chip 100 (e.g., silicon chip or chip). The chip 100 can contain one or more metal layers 110 as shown in FIG. 1B. Each metal layer can contain power wires, ground wires, signal wires, metal fill, etc. The width and/or thickness of metal wires in a metal layer may be altered in a semi-conductor fabrication process, for example, etching, CMP processing, etc. Metal layer or metalization layer is a layer in a semi-conductor chip to provide metal wires to interconnect individual devices such as transistors, resistors, capacitors, etc.

Figure 2:
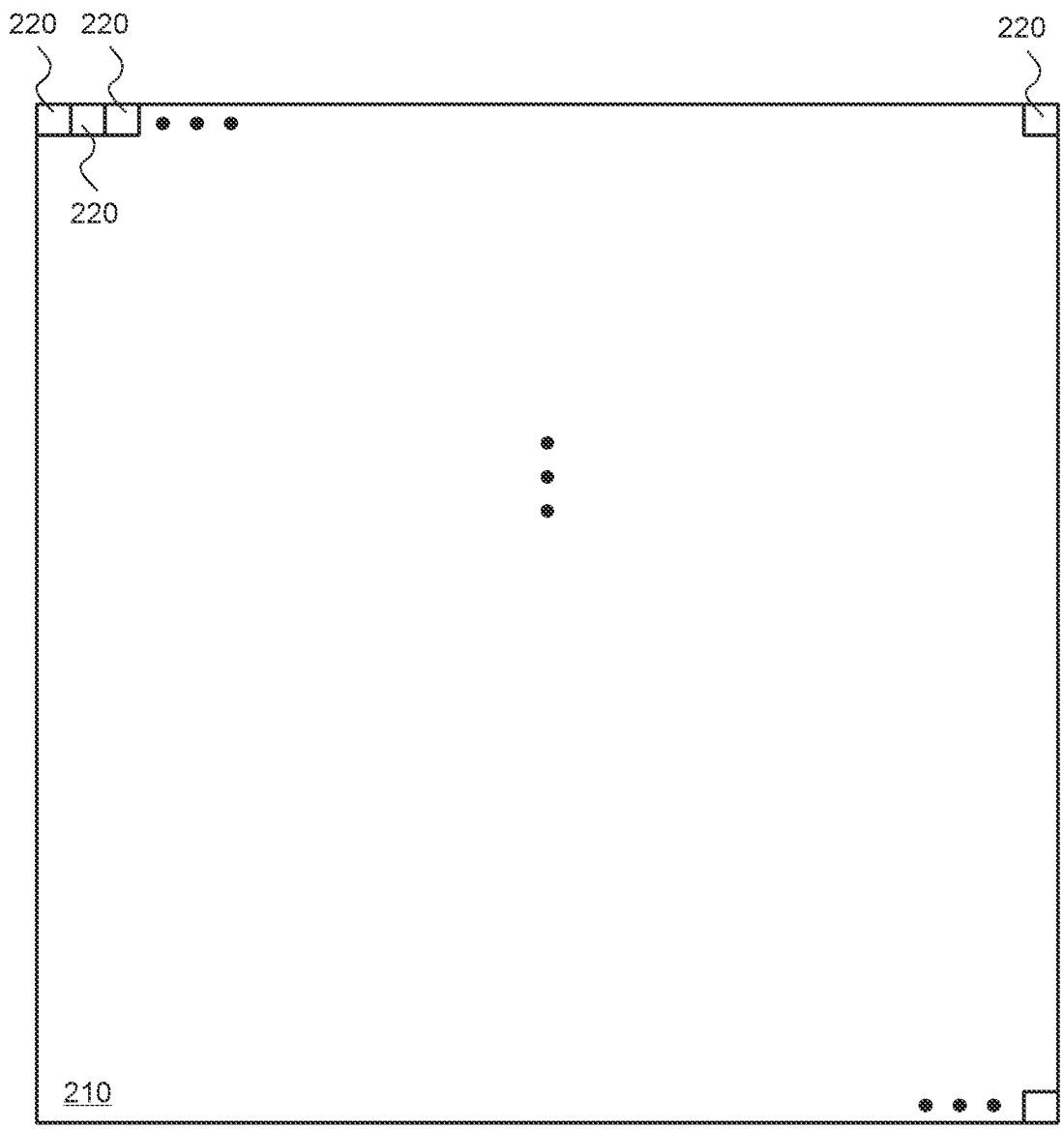
FIG. 2 is a diagram showing an example partition scheme of a metal layer into areas.

A metal layer 210 of a semi-conductor chip can be partitioned into a number of areas 220. An example partition scheme is shown in FIG. 2. For example, a '2 cm×2 cm' metal layer can be partitioned into one hundred million '20 µm×20 µm' areas. Geometries (e.g., metal wires) in a metal layer can be defined in a specification for a semi-conductor chip. Geometries can be specified with a common shared format, for example, Graphic Design System (GDS), Library Exchange Format (LEF), Design Exchange Format (DEF), or other applicable formats.

GDS is a database file format which is the de facto industry standard for data exchange of IC layout artwork. GDS is a binary file format representing planar geometric shapes, text labels, and other information about the layout in hierarchical form. The data can be used to reconstruct all or part of the artwork to be used in sharing layouts, transferring artwork between different tools, or creating photomasks. Objects contained in a GDS file are grouped by assigning numeric attributes to them including a "layer number", "datatype" or "texttype". While these attributes are designed to correspond to the "layers of material" used in manufacturing an integrated circuit, their meaning rapidly became more abstract to reflect the way that the physical layout is designed.

Library Exchange Format (LEF) is a specification for representing the physical layout of an integrated circuit in an ASCII format. It includes design rules and abstract information about the cells. LEF is used in conjunction with Design Exchange Format (DEF) to represent the complete physical layout of an integrated circuit during an IC design process.

Design Exchange Format (DEF) is an open specification for representing physical layout of an integrated circuit in an American Standard Code for Information Interchange (ASCII) format. It represents the netlist and circuit layout.

DEF files are usually generated by place and route tools and are used as an input for post analysis tools, such as extraction tools or power analysis tools.

ASCII is a character encoding standard for electronic communication. ASCII codes represent text in computers, telecommunications equipment, and other devices. Most modern character-encoding schemes are based on ASCII, although they support many additional characters.

A photomask is an opaque plate with holes or transparencies that allow light to shine through in a defined pattern. They are commonly used in photolithography and the production of ICs in particular. Photomasks are used to produce a pattern on a substrate, normally a thin slice of silicon known as a wafer in chip fabrication/manufacturing. A set of photomasks, each defining a pattern layer in integrated circuit fabrication, is fed into a photolithography stepper or scanner, and individually selected for exposure. In double patterning techniques, a photomask would correspond to a subset of the layer pattern.

On-chip silicon density calculation is one of the key steps during on-chip parasitic extraction, because local thickness and width of metal wires directly affect the value of parasitic extraction. Such an effect becomes significant for a technology node below 5 nm.

Metal density in a given region is defined as the total metal geometry area (i.e., two-dimensional representation of the geometries) divided by the area of the given region. There are two types of metal densities to be calculated: drawn density and silicon density.

Drawn density is the density of design geometry of a metal layer of a semi-conductor chip. Therefore, the drawn density is calculated according to a design geometry defined in a specification for a semi-conductor chip.

Silicon density is the density of actual geometry of a metal layer of a semi-conductor chip (i.e., final silicon). However, the actual geometry is unavailable during chip design stage. A numerical simulation can be used to estimate the silicon density. The simulation includes effects due to etching and/or CMP process. Silicon density is a function of the calculated drawn density, the set of photomasks for fabrication of the chip and corresponding numerical characteristics of metal wires. The numerical characteristics of the metal wires can include a number of statistical information, for example, minimum, average, standard deviation of metal wire widths and/or spacing for each of the set of photomask. Each photomask is associated with a particular color and corresponds to an etching process and/or a CMP process.

Density has a range as a real number between zero (0) and one (1). In general, drawn density and silicon density of in the same region/area are different due to the difference between design geometry and estimated actual geometry.

Figure 3A:
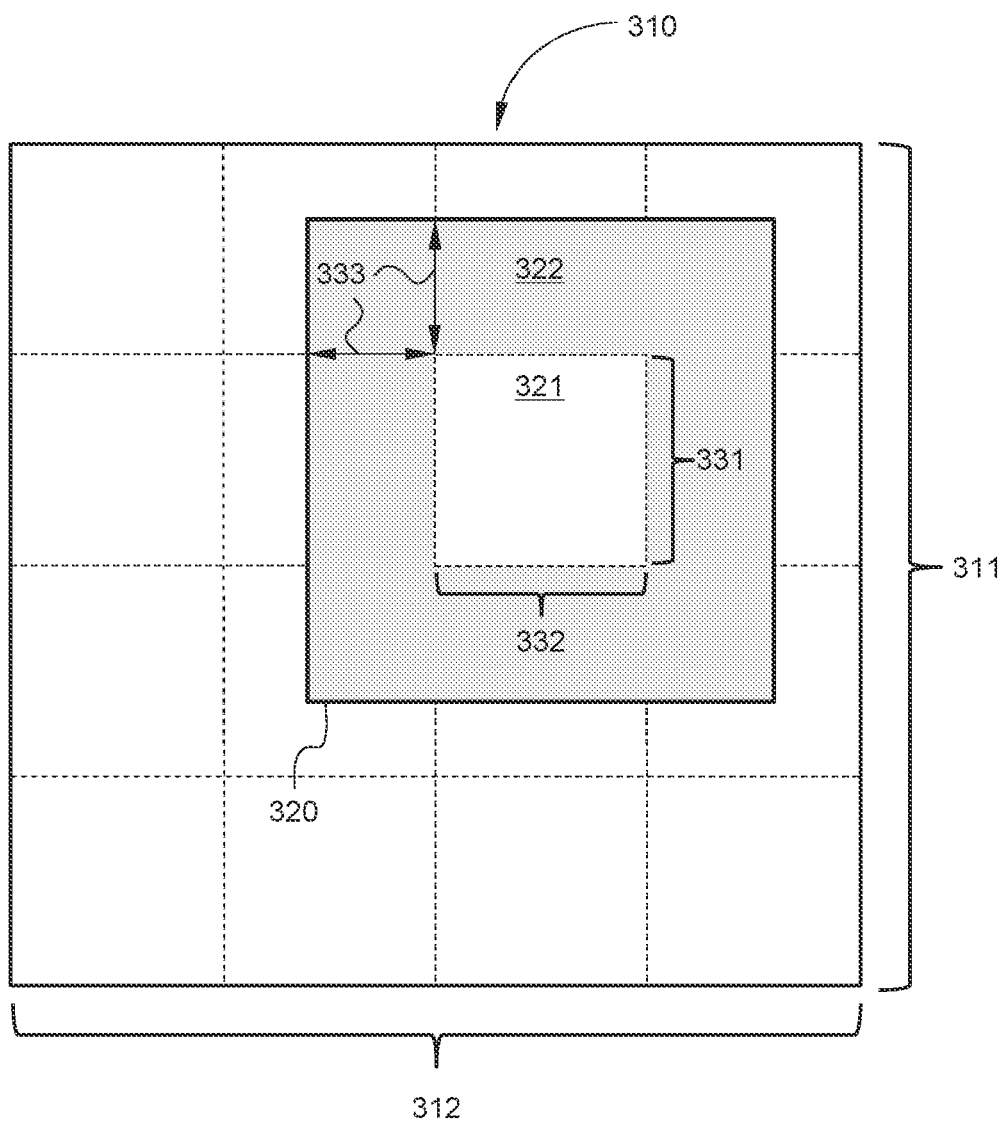
FIG. 3A is a diagram showing an example division scheme for generating an image for a region in an area in a metal layer.

FIG. 3A shows that an example area 310 is subdivided into 4×4 or 16 regions 321. This is an example for N equals to 4. Each area is further subdivided into N×N regions. An image for a region 321 in a metal layer of a semi-conductor chip can be generated from a specification for a semi-conductor chip, for example, the set of photomasks associated with a metal layer of the semi-conductor chip. The photomasks correspond to a two-dimensional representation for geometries (metal wires, metal fills) of the metal layer. Each photomask is represented in a separate and different color.

The image for the region 321 covers a portion 320 of the metal layer. The portion 320 includes the region 321 and a surrounding area 322 (halo area). The surrounding area 322 is included to account for effects of neighboring regions to the region 321. The width 333 of the surrounding area 322 can be adjusted, for example, the surrounding area for a 5 nm technology node can be different for a 3 nm technology node. In the example shown in FIG. 3A, the dimension (i.e., area width 312 and area height 311) of the area 310 is 20 μm by 20 μm hence each region's dimension (i.e., region width 332 and region height 331) is 5 μm by 5 μm. In this example, the surrounding area 322 has a width 333 of 3 μm.

Figure 3B:
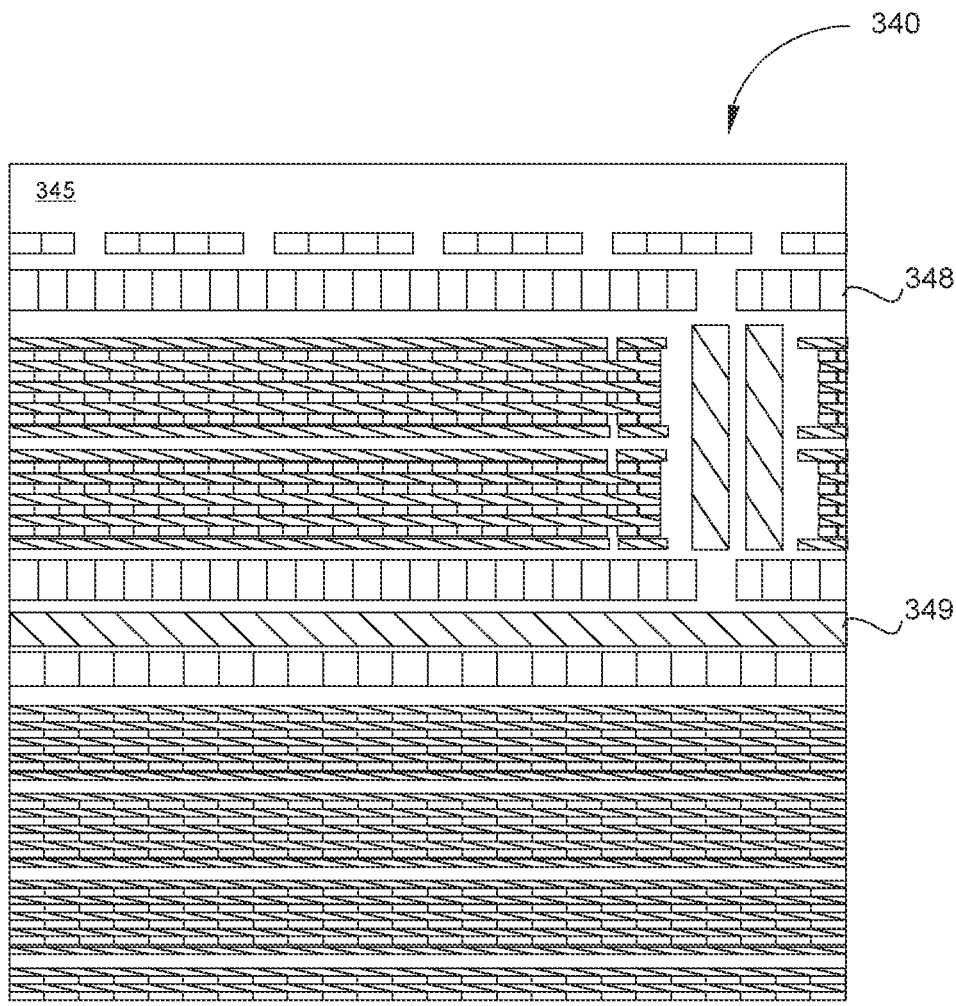
FIG. 3B is a diagram showing an example image for a region.

FIG. 3B is an image 340 (i.e., two-dimensional representation of geometries) showing an example region 345 having various geometries or metal wires (shaded area). Different shaded patterns represent different colors (e.g., vertical pattern 348 for green and slanted pattern for red 349) of respective photomasks. Drawn density and numerical characteristics of metal wires in the region 345 can be calculated accordingly. The numerical characteristics can be calculated for each photomask (i.e., each color in the image). The color may include red, green, purple, blue or any other applicable colors used in semi-conductor fabrication plants.

Each image for a region can contain information of colors of the photomasks associated with the metal layer. For example, each image can be represented with 128×128 pixels. Each pixel is represented by three positive integers (e.g., 0-255) for intensity of three colors (i.e., Red, Green and Blue). Other image resolutions may be used for achieving the same, for example, 256×256 pixels.

Figure 3C:
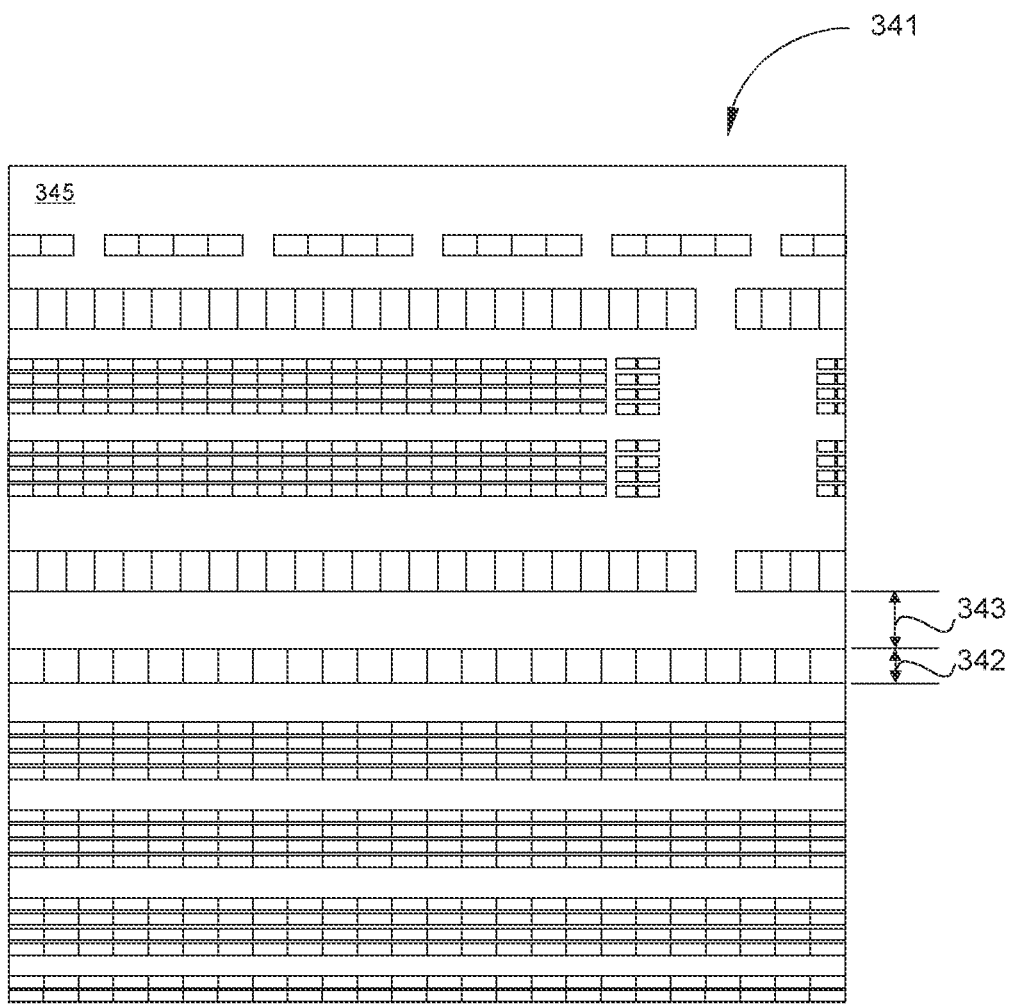
FIG. 3C is a diagram illustrating an example image of geometries for a region for a particular photomask.

FIG. 3C is an image 341 showing geometries of the example region 345 with one particular color (i.e., one particular photomask). The width 342 of a metal wire is defined as the vertical distance of a wire. The spacing 343 of metal wires is defined as vertical distance between two metal wires. Thickness of a metal wire is a distance perpendicular to the image 341 thereby not shown.

Figure 3D:
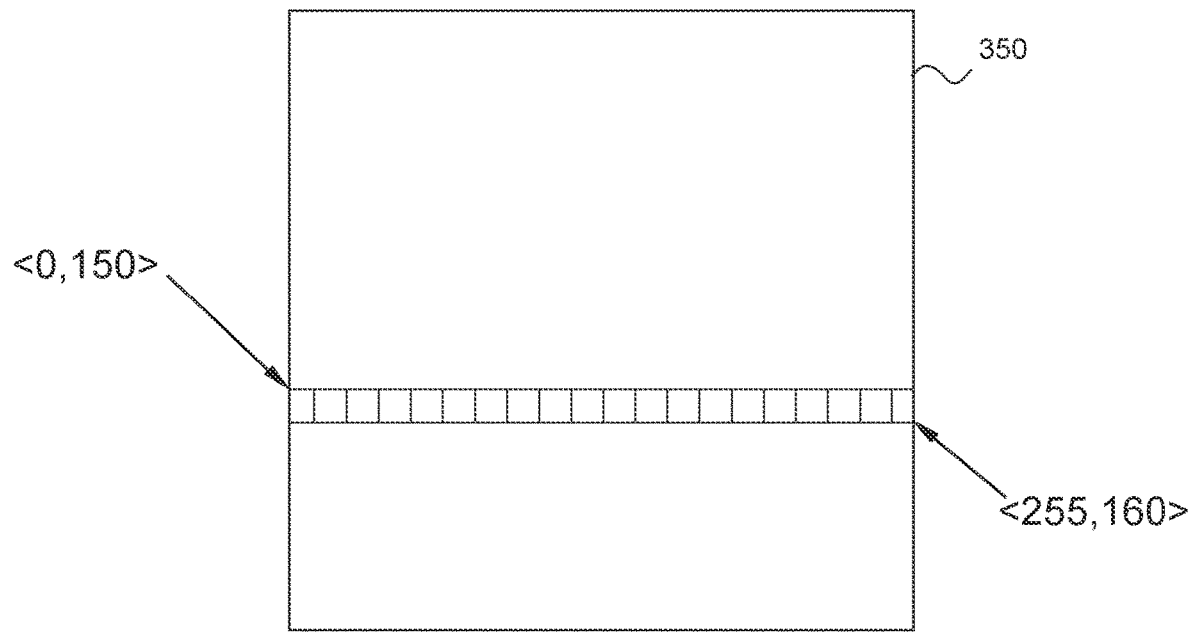
FIG. 3D is a diagram showing an example image construction scheme.

A relatively faster image generation scheme is based on the original geometry definition such as coordinate and pixel (i.e. color) value. For example, shown in FIG. 3D, a 256×256 pixels image 350 may contain information such as upper left corner coordinate <0,150>, bottom right coordinate <255,155>, and pixel value of (0, 255, 0) or color Green.

A silicon density 450 of the geometries for a region can be predicted via a trained machine learning model (MLM-0 420) using the image 410 and the drawn density 411 of the geometries for the region. Both the image 410 and the drawn density 411 are based on design geometry in a specification for a semi-conductor chip.

Figure 4A:
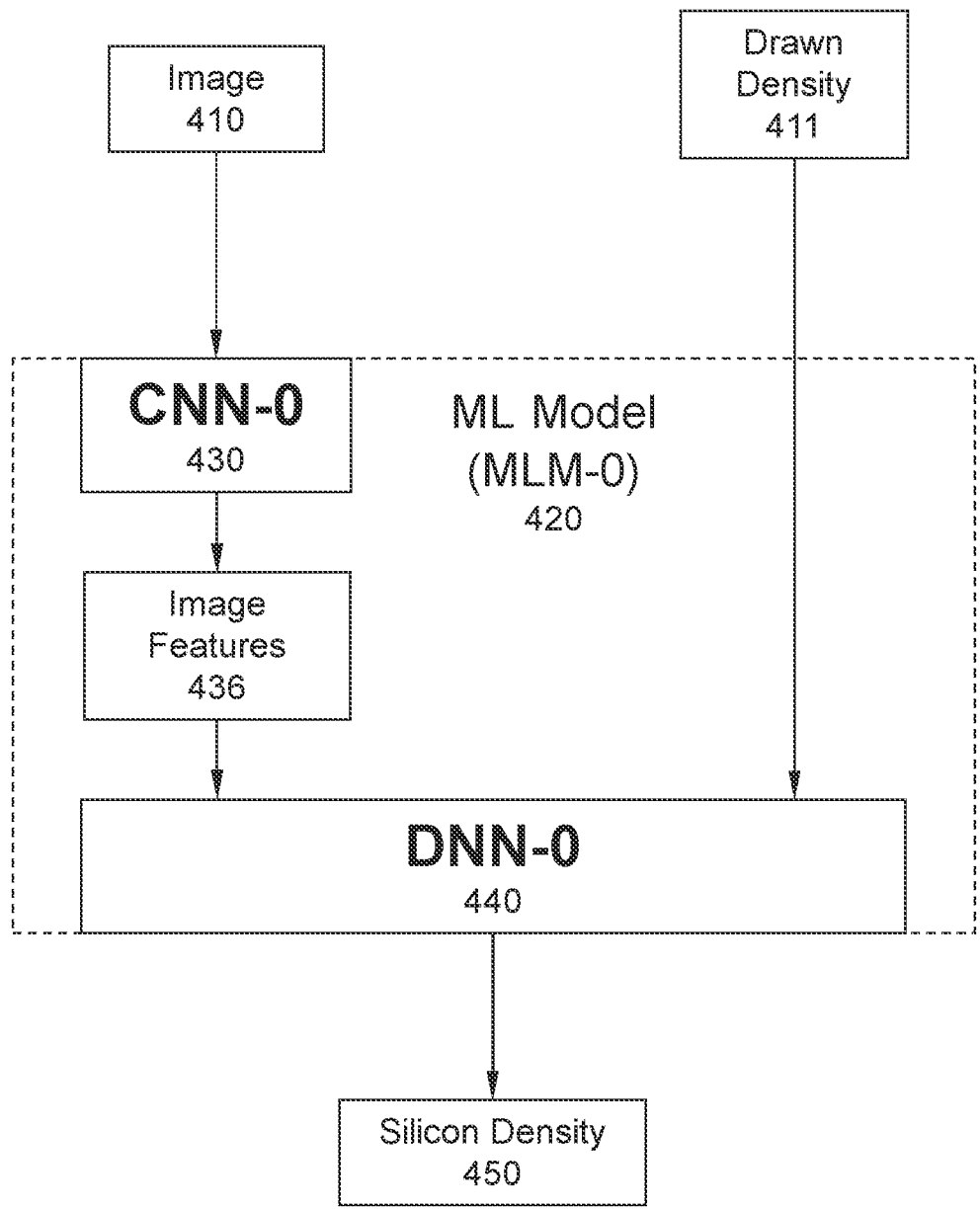
FIG. 4A is a schematic diagram showing a first example model for predicting a silicon density for a metal layer of a semi-conductor chip.

FIG. 4A is a schematic diagram showing a first example model (MLM-0) 420 for predicting a silicon density of the geometries for a region. The first example model (MLM-0) 420 includes a convolution neural network (CNN-0 430) followed by a deep neural network (DNN-0 440). The image 410 for the region in a metal layer covers a corresponding portion of the photomasks associated with the metal layer. The corresponding portion includes the region and a surrounding area. The image 410 is the input to CNN-0 430 for generating image features 436. The image features 436 and the drawn density 411 are the input to DNN-0 440 for predicting silicon density 450. In one embodiment, CNN-0 430 may contain six convolution layers with 16 filters per convolution layer. DNN-0 440 may contain three fully-connected layers with 64 neurons per fully-connected layer.

In the subdivision scheme shown in FIG. 3A, each image represents one of the 16 regions. As a result, 16 predicted silicon densities for 16 respective regions can be obtained. In order to predict a more accurate silicon density. An averaged value of the 16 predicted silicon densities is used.

Figure 4B:
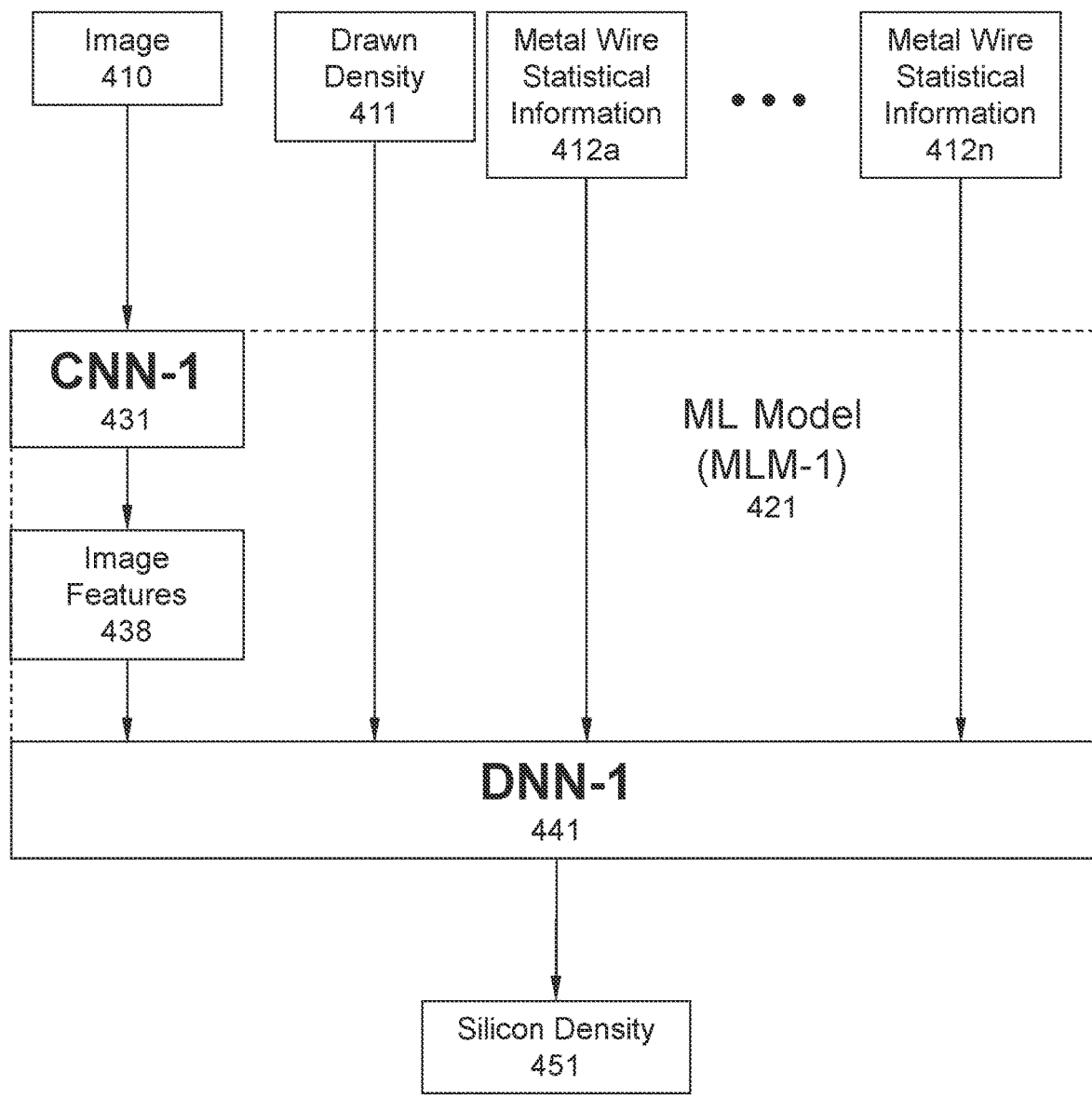
FIG. 4B is a schematic diagram showing a second example model for predicting a silicon density for a metal layer of a semi-conductor chip.

FIG. 4B shows that a second example model MLM-1 421 contains a convolutional neural network (CNN-1 431) followed by a deep neural network (DNN-1 441). Input to the MLM-1 421 contains an image 410, the drawn density 411, and numerical characteristics of the metal wires 412a-412n for a region. The image 410 covers a corresponding portion of the photomasks associated with a metal layer. The drawn density 411 and the numerical characteristics 412a-412n are calculated according to the design geometry from a specification for a semi-conductor chip.

The image 410 is the input to CNN-1 431 for generating image features 438. The image features 438, the drawn density 411 and the numerical characteristics 412a-412n are the input to DNN-1 441. Silicon density 451 is predicted by DNN-1 441.

Figure 4C:
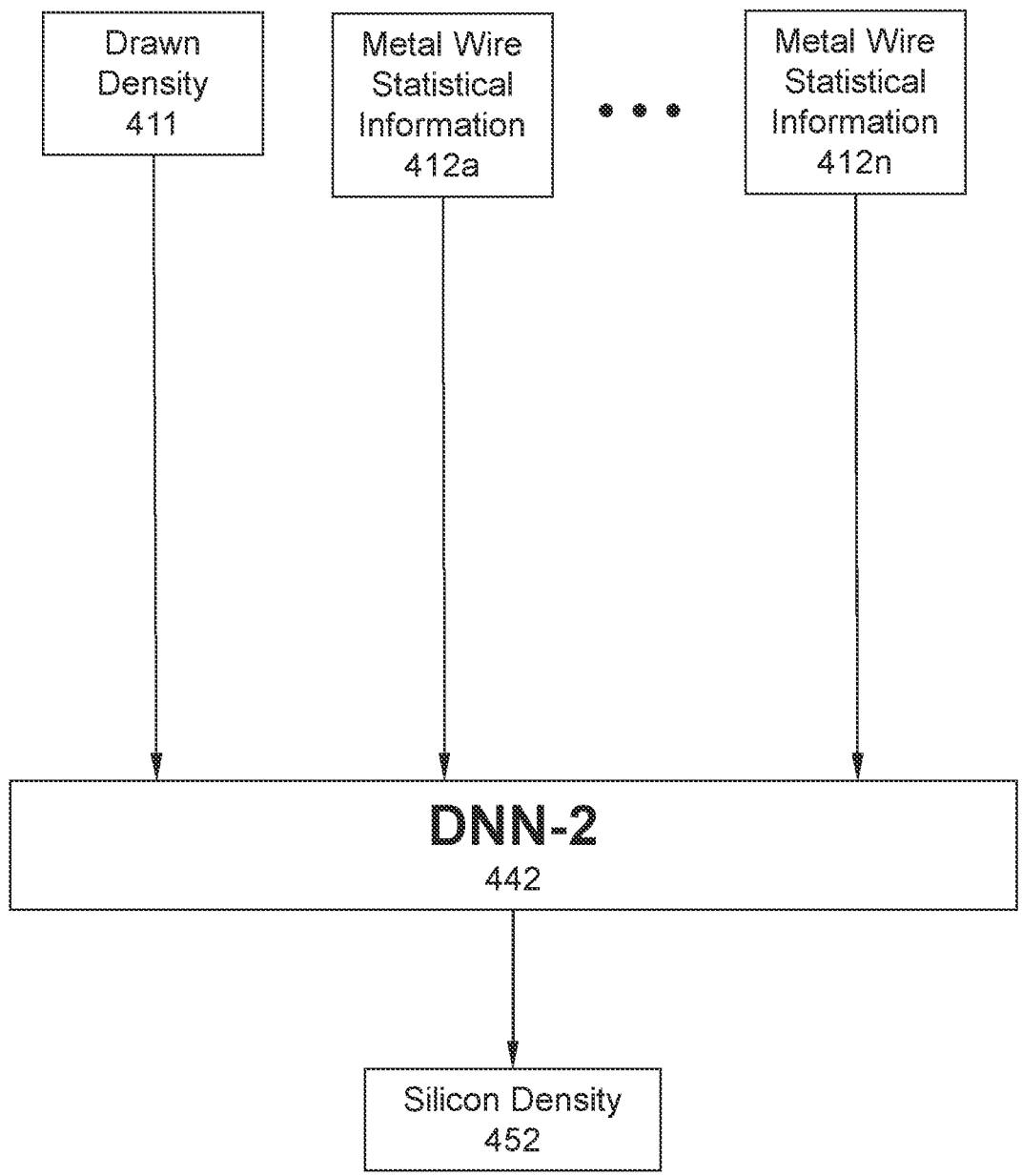
FIG. 4C is a schematic diagram showing a third example model for predicting a silicon density for a metal layer of a semi-conductor chip.

FIG. 4C shows a third example model which contains just a deep neural network (DNN-2 442). The third example model is for a situation that the image for a region is unavailable. Input to the DNN-2 442 includes the drawn density 411 and the numerical characteristics of the metal wires 412a-412n for a region. Output of DNN-2 442 is a silicon density 452 for the region.

Figure 5:
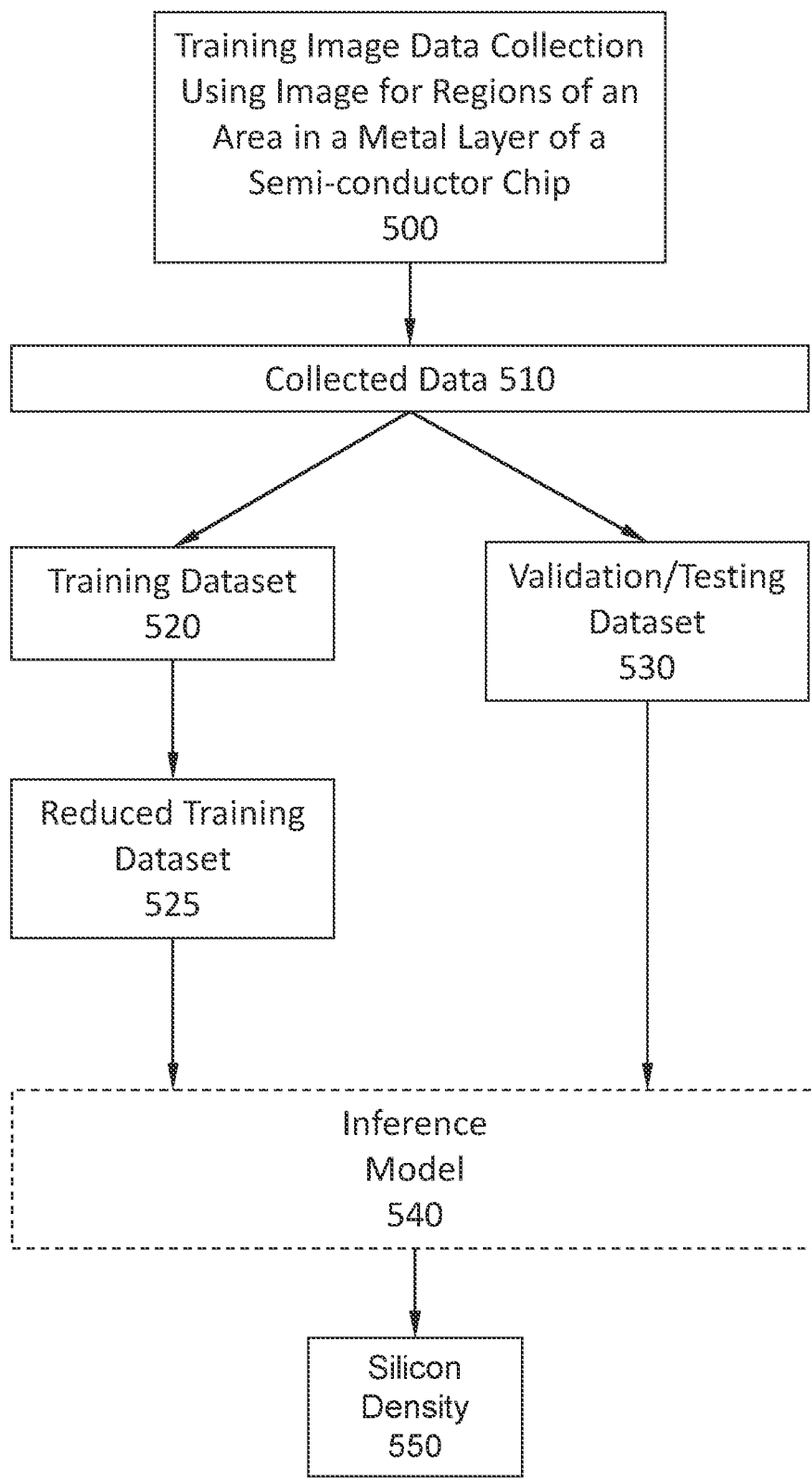
FIG. 5 is a schematic diagram showing an example training procedure of a machine learning model for predicting a silicon density for a metal layer of a semi-conductor chip.

A schematic diagram for training a model for predicting a silicon density of geometries of a metal layer is shown in FIG. 5. Training image data 500 is collected from a given chip design (e.g., a particular metal layer and a technology used in manufacturing of the chip). Each metal layer is partitioned into a number of sample images (i.e., region images). An efficient image construction method can be used, for example, using the original geometry definition such as coordinates and pixel (color) values. All collected image data (e.g., sample images) is stored in a dataset 510, which is split into a training dataset 520 and a validation/testing dataset 530. There are many known methods to split a dataset, for example, 60% for training, the remaining for validation and testing. Since the numbers of sample images in the training dataset 520 can still be huge, many duplicated and/or similar patterned images can be removed to form a reduced training dataset 525. Removing substantially similar or duplicated images can be performed in several known manners, for example, random sampling based on similarly matched drawn density and silicon density values, or filtering out certain sample images, for example, any image having structural similarity index (SSIM) greater than 0.9 compared to an existing sample image. One example matching technique is to compare drawn density value and silicon density of a first sample image with those values of a second sample image. A match can be determined if the drawn density value and silicon density value are within a predefined threshold (e.g., less than 0.1%).

In the training dataset, each sample image can be labeled with a determined silicon density, which is a target value for training a machine learning model that predicts a silicon density. The silicon density of the geometries for a region can be determined in a simulation.

Inference model 540 (e.g., a neural network containing a CNN followed by a DNN) is trained using the image samples in the reduced training dataset 525, and then tested/validated using the validation/testing dataset (e.g., through cross-fold model evaluation). In other words, model weights of the CNN and the DNN are adjusted in the training to improve the predication accuracy of the inference model. Model weights can contain filter coefficients of each filter in each convolution layer of the CNN. Filter coefficients may include convolution coefficients, bias coefficients, etc. Model weights can also be weight coefficients of each neuron of the DNN.

Figure 6:
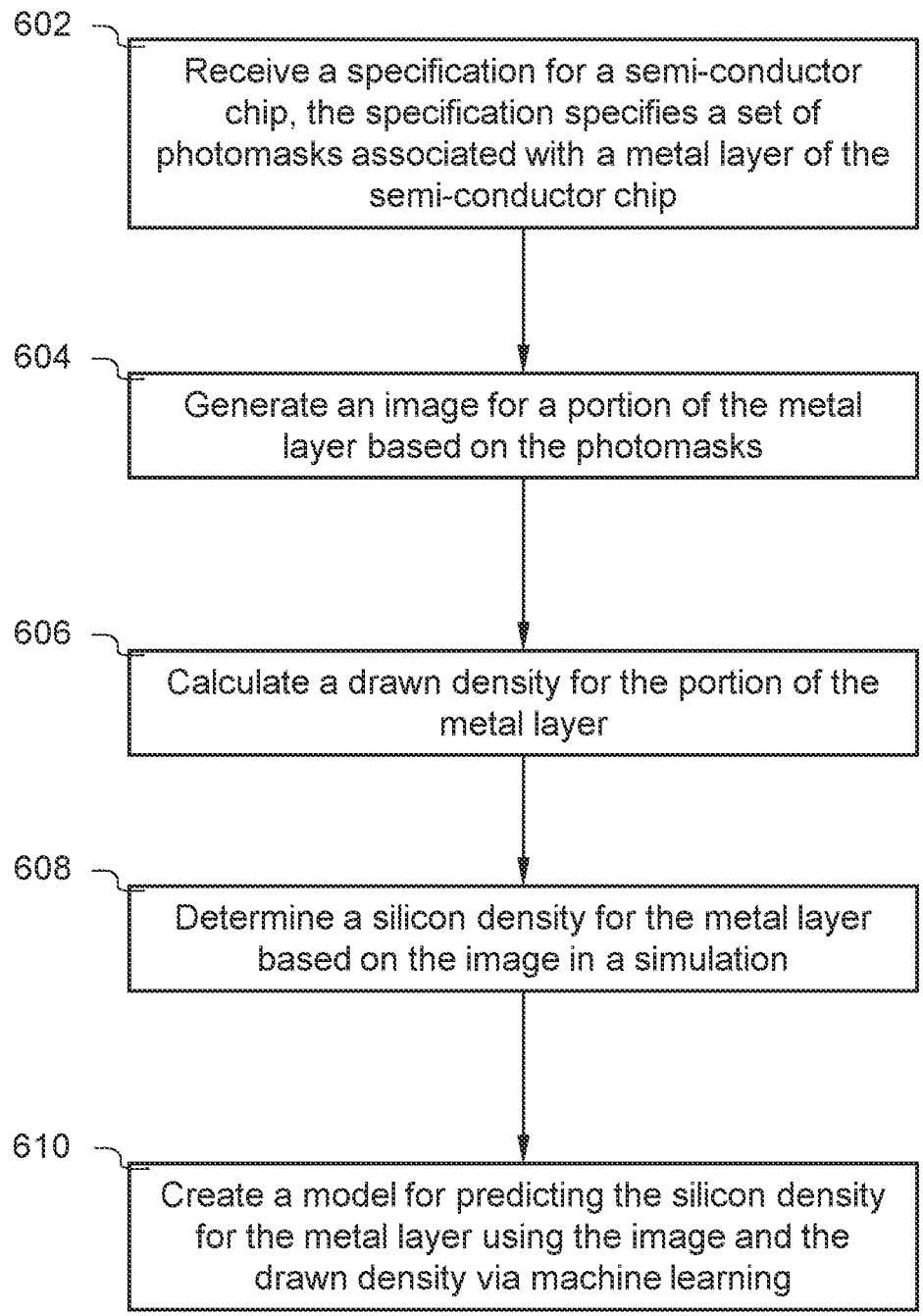
FIG. 6 is a flowchart illustrating an example process of creating a model for predicting silicon density for a metal layer of a semi-conductor chip via machine learning.

FIG. 6 is a flowchart illustrating an example process 600 of creating a model for predicting a silicon density for a metal layer of a semi-conductor chip via machine learning.

Figure 9A:
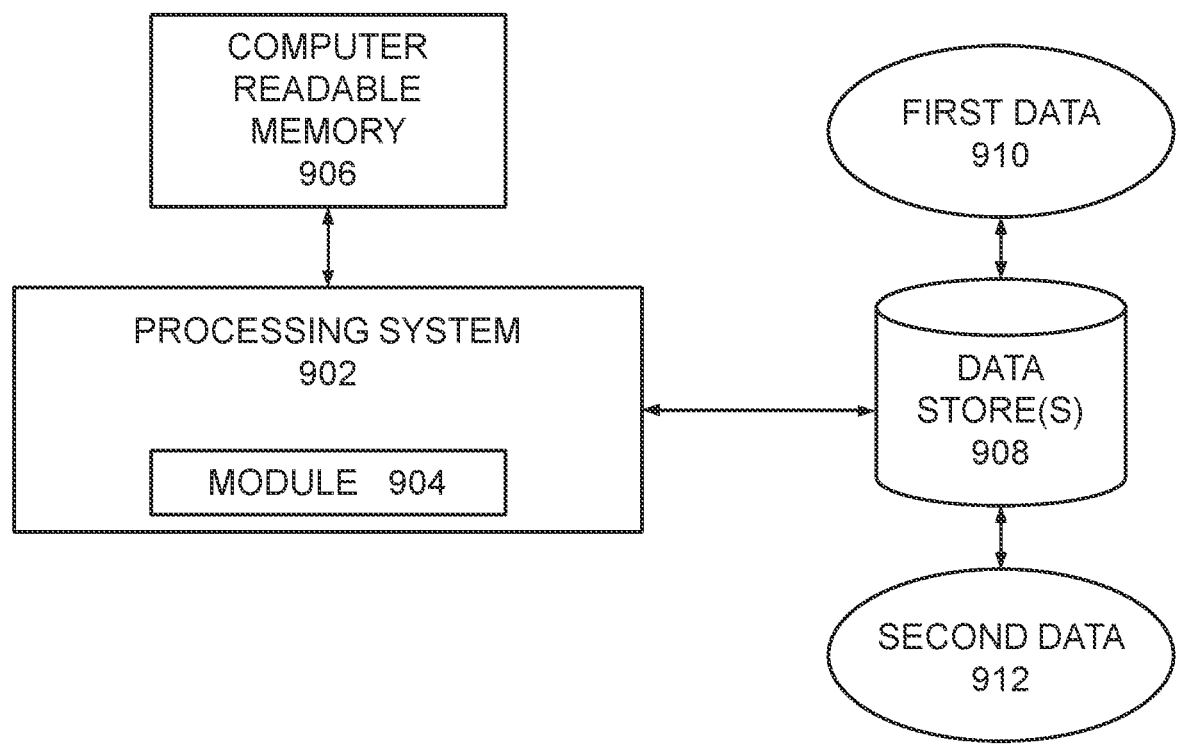
FIG. 9A is a block diagram showing an example system including a standalone computing architecture.
Figure 9B:
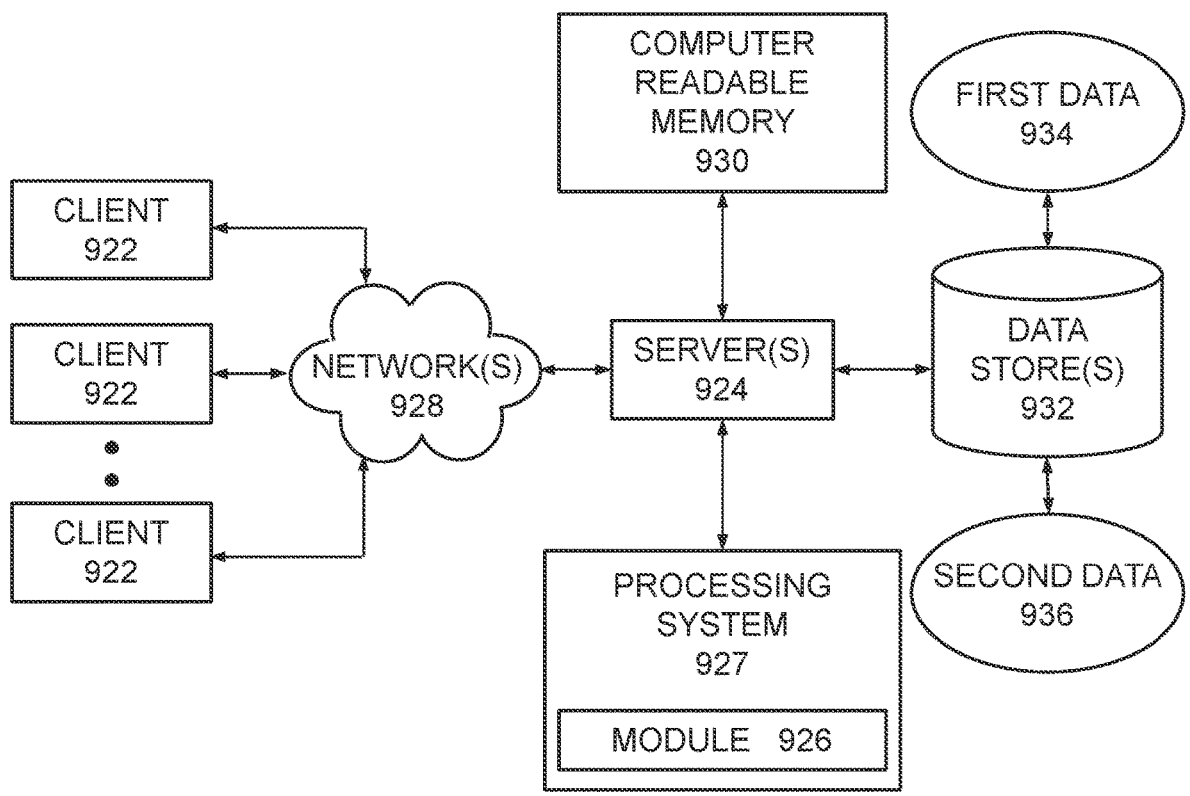
FIG. 9B is a block diagram showing an example system including a client-server computing architecture.

Process 600 starts at action 602 by receiving a specification for a semi-conductor chip (e.g., a silicon chip) in a computer system (e.g., computer systems shown in FIGS. 9A-9B). The specification specifies a set of photomasks, which is associated with a metal layer of the semi-conductor chip. Geometries in the metal layer may contain metal wires (i.e., power, signal, ground wires), metal fills, etc.

Next, at action 604, an image for a portion of the metal layer is generated from the specification (e.g., design geometry of the metal layer) based on the set of photomasks. For example, the image covers a corresponding portion of the photomasks. The corresponding portion can include a region and a surrounding area of the region. In one embodiment, a metal layer is partitioned into M areas. An example partition scheme is shown in FIG. 2. Each area is further subdivided into N×N regions. M and N are positive integers. FIG. 3A shows an example subdivision scheme for N equals to 4.

The drawn density for the portion of the metal layer can be calculated from the design geometry in the specification at action 606. Next, at action 608, silicon density for the portion of the metal layer is determined based on the image in a simulation. Finally, at action 610, a model is created for predicting silicon density for the metal layer using the image and the drawn density via machine learning. For example, a neural network containing a CNN and a DNN can be trained for predicting silicon density of the geometries in a region and/or a portion.

Figure 7:
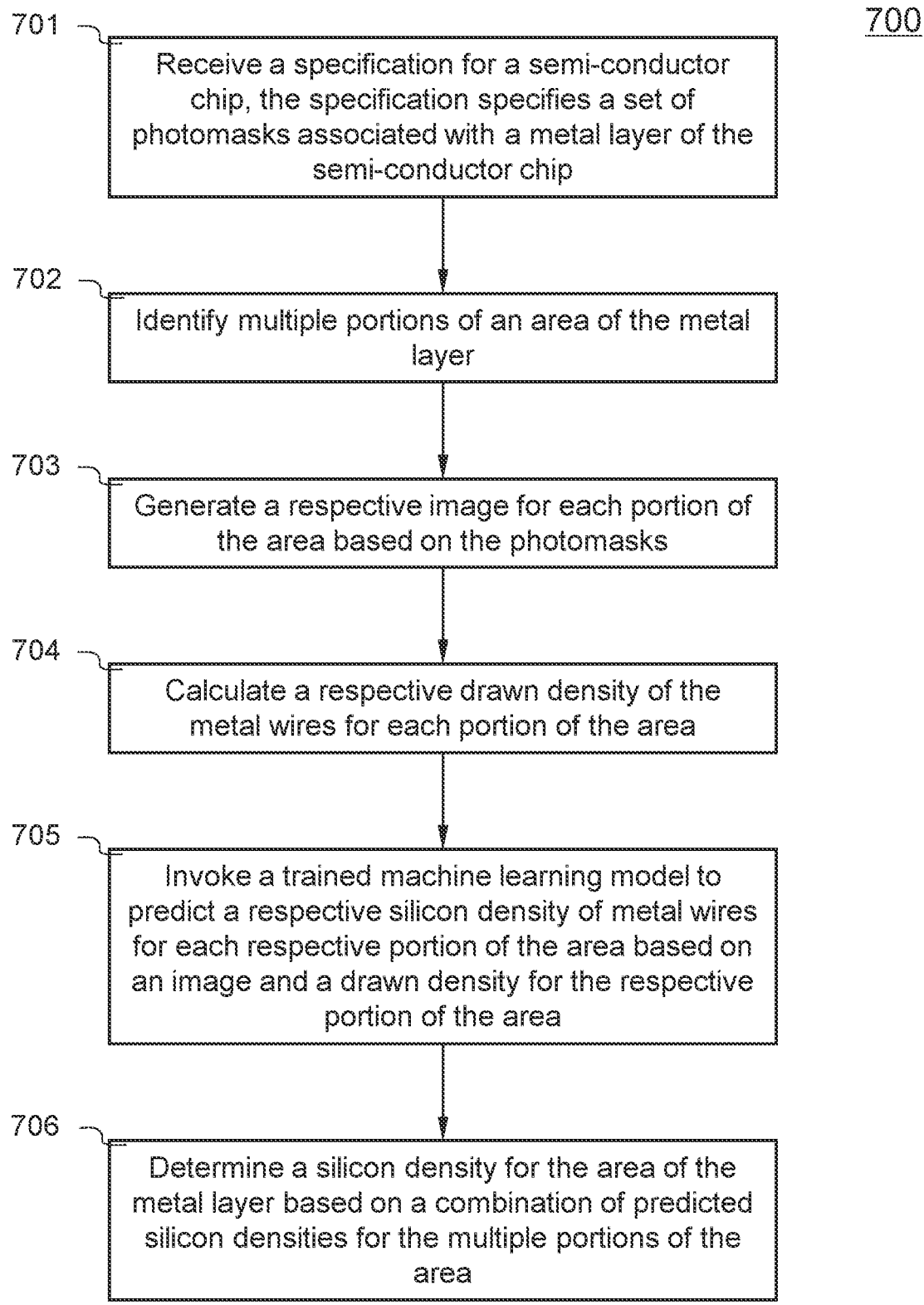
FIG. 7 is a flowchart illustrating an example process of predicting silicon density for a metal layer of a semi-conductor chip via a trained machine learning model.

FIG. 7 is a flowchart illustrating an example process 700 of predicting a silicon density for a metal layer of a semi-conductor via a trained machine learning model. Process 700 starts at action 701 by receiving a specification for a semi-conductor chip in a computer system (e.g., computer systems shown in FIGS. 9A-9B). The specification includes a set of photomasks, which is associated with a metal layer of the semi-conductor chip. The metal layer contains metal wires. Next, action 702, multiple portions of an area of the metal layer are identified. In one embodiment, the metal layer is divided into M areas. Each area is then subdivided into N×N regions. M and N are positive integers. A corresponding image for each portion of the area is generated based on the photomasks at action 703. The image for each portion covers a region and a surrounding area. Drawn density of the metal wires for each portion of the area is calculated at action 704. At action 705, a trained machine learning model (e.g., inference model 540 in FIG. 5) is invoked to predict a silicon density of the metal wires for each respective portion of the area based on an image and a drawn density for the respective portion of the area.

Finally, at action 706, a silicon density for the area of the metal layer is determined based on a combination of predicted silicon densities for the multiple portions of the area. For example, the silicon density of an area can be an averaged value of N×N predicted silicon densities for the respective N×N portions. The averaged value may be calculated using various techniques, for example, simple average, weighted average, etc. In the example shown in FIG. 3A, the silicon density for the area 310 is an averaged value of 16 predicted silicon densities of respective 16 portions.

In one embodiment, the trained machine learning (ML) model contains a CNN followed by a DNN. A schematic diagram of such an example ML model is shown in FIG. 4A. The input to the CNN is the image. The output of the CNN contains image features. The image features and the calculated drawn density are then inputted to the DNN to predict a silicon density for the metal layer. An alternative example trained ML model is shown in FIG. 4B. In another embodiment, a trained ML model contains only a DNN such as the model shown in FIG. 4C.

Figure 8:
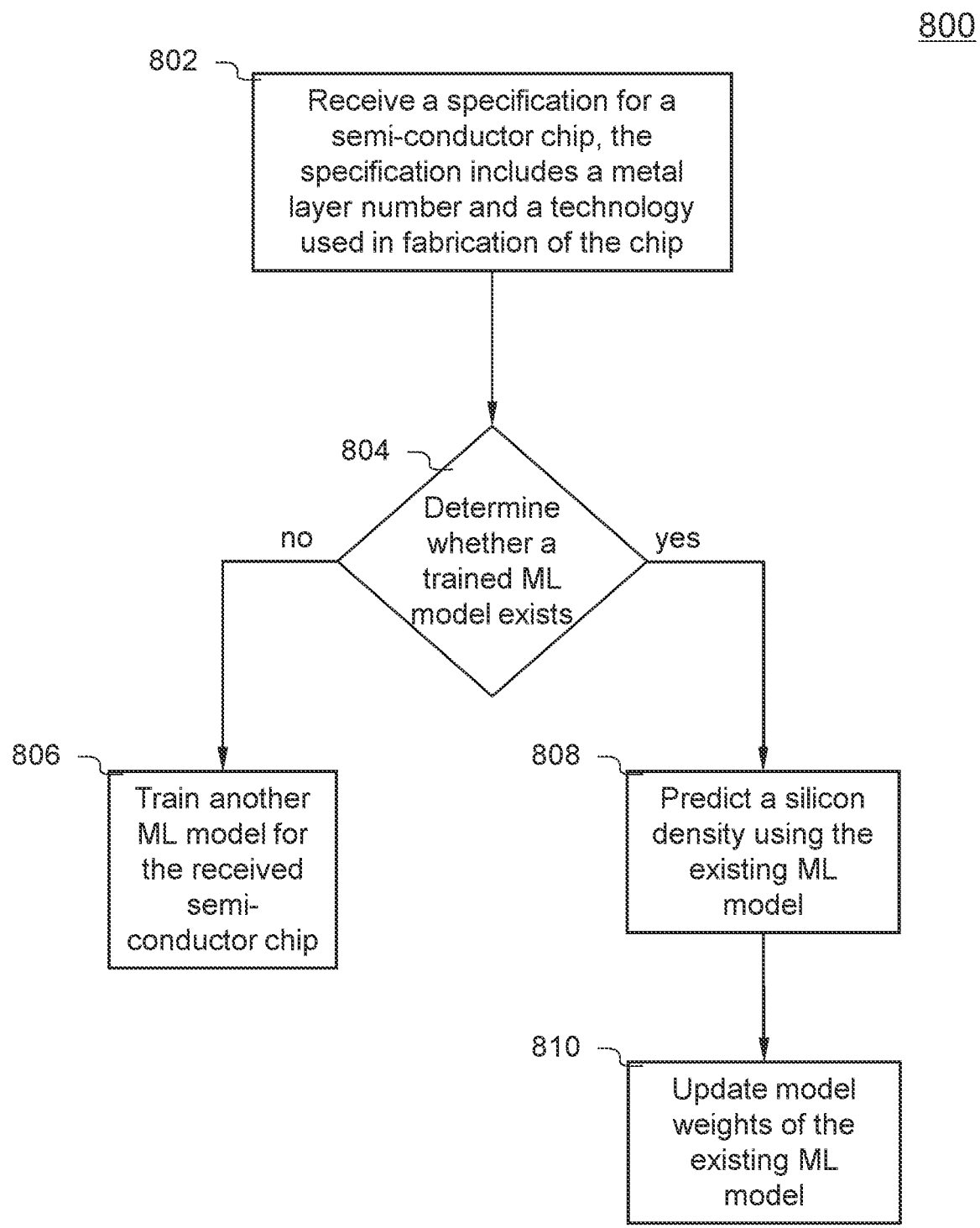
FIG. 8 is a flowchart illustrating an example process of incremental training a machine learning model for predicting silicon density.

FIG. 8 is a flowchart illustrating an example process 800 of incremental training of a machine learning (ML) model for predicting a silicon density for a metal layer of a semi-conductor chip. Process 800 starts at action 802 by receiving a specification for a semi-conductor chip. The specification contains information such as metal layer number, technology used in fabrication of the chip, etc. Next, at decision 804, it is determined whether a trained ML model exists for the received specification (i.e., a particular metal layer number, technology). If false, process 800 follows the "no" branch to action 806, in which a new ML model is trained for the received semi-conductor chip specification. Otherwise, process 800 moves to action 808 where a silicon density can be predicted using the existing ML model. Model weights of the existing ML model can be improved and updated with the received semi-conductor specification at action 810.

The subject matter described herein may be implemented using any suitable processing system with any suitable combination of hardware, software and/or firmware, such as described below with reference to the non-limiting examples shown in FIGS. 9A-9C.

FIG. 9A depicts an example system 900 that includes a standalone computer architecture where a processing system 902 (e.g., one or more computer processors) includes a module 904 (e.g., software module stored in memory) being executed on it. The processing system 902 has access to a non-transitory computer-readable memory 906 in addition to one or more data stores 908. The one or more data stores 908 may contain first data 910 as well as second data 912.

FIG. 9B depicts another example system 920 that includes a client-server architecture. One or more clients 922 (e.g., user personal computer, workstation, etc.) accesses one or more servers 924 executing computer instructions of a module 926 (e.g., software module stored in memory) on a processing system 927 via one or more networks 928. The one or more servers 924 may access a non-transitory computer readable memory 930 as well as one or more data stores 932. The one or more data stores 932 may contain first data 934 as well as second data 936.

Figure 9C:
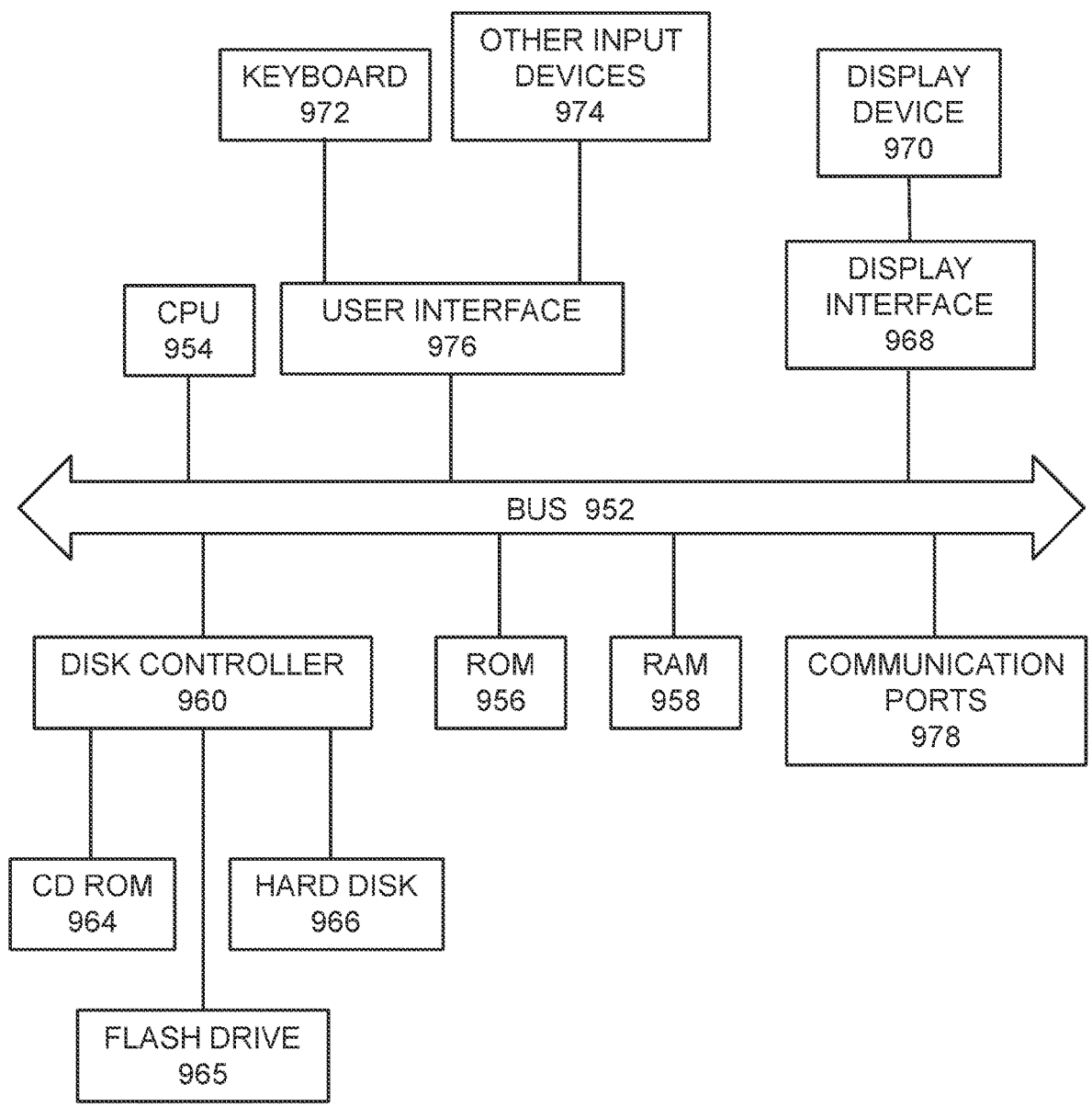
FIG. 9C is a function block diagram showing salient components of an example computing device for implementing the subject matters described herein.

FIG. 9C shows a function block diagram of example hardware for a standalone computer architecture 950, such as the architecture depicted in FIG. 9A, that may be used to contain and/or implement the subject matter described herein. A bus 952 may serve as the information highway interconnecting the other illustrated components of the hardware. A processing system 954 labeled CPU (central processing unit) (e.g., one or more computer processors), may perform calculations and logic operations required to execute a program/software/module. A non-transitory computer-readable storage medium, such as read only memory (ROM) 956 and random access memory (RAM) 958, may be in communication with the processing system 954 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 978.

A disk controller 960 interfaces one or more optional disk drives to the system bus 952. These disk drives may be external or internal flash memory drives 965, external or internal CD-ROM, CD-R, CD-RW or DVD drives 964, or external or internal hard disk drives 966. As indicated previously, these various disk drives and disk controllers are optional devices.

If needed, the processor 954 may access each of the following components: real-time data buffer, conveyors, file input processor, database index shared access memory loader, reference data buffer and data managers. Each component may include a software application stored in one or more of the disk drives connected to the disk controller 960, the ROM 956 and/or the RAM 958.

A display interface 968 may permit information from the bus 952 to be displayed on a display 970 in audio, video, graphical, text, or alphanumeric format.

In addition to the standard computer-type components, the hardware may also include data input devices, such as a keyboard 972, or other input device 974, such as a microphone, remote control, pointer, mouse, touch screen, and/or joystick.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Additionally, used herein, the terms "vertical", "horizontal", "thickness", "spacing", "width", and "height" are intended to provide relative positions/locations for the purposes of description, and are not intended to designate an absolute frame of reference. Further, the order of blocks in process flowcharts or diagrams do not inherently indicate any particular order nor imply any limitations.

Although the subject matter has been described with reference to specific embodiments thereof, these embodiments are merely illustrative, and not restrictive of, the invention. Various modifications or changes to the specifically disclosed example embodiments will be suggested to persons skilled in the art. Whereas the shape of an example metal layer in a semi-conductor chip has been shown and described as a square, other shapes may be used, for example, rectangle. Additionally, whereas the dimensions of an example area has been shown and described as 20 μm by 20 μm, other dimensions may be used for achieving the same, for example, 30 μm by 30 μm. Furthermore, whereas an example subdivision scheme of an area has been shown and describe as 4×4, other subdivision schemes may be used for achieving the same, for example, 5×5. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method comprising:
    receiving a specification for a chip, the specification specifying a set of geometries associated with a layer of the chip, wherein the set of geometries are associated with a plurality of components;
    generating an image for each of a plurality of portions of the layer based on the geometries;
    calculating a drawn density for the plurality of components within each of the plurality of portions;
    for each of the plurality of portions, using an analytical model to predict a component silicon density of the plurality of components for that portion based on the image and the drawn density for that portion; and
    determining a silicon density for the layer based on a plurality of predicted component silicon densities for the plurality of portions;
    wherein the analytical model comprises a first software module comprising a first neural network configured to extract a set of image features from the image, and a second software module comprising a second neural network configured to determine the silicon density based on the set of image features and the drawn density.

2. The method of claim 1, wherein the plurality of components comprise one or both of metal wires and metal fills.

3. The method of claim 1, wherein the analytical model comprises a trained machine learning model that is configured to execute the first software module and the second software module.

4. The method of claim 3, wherein the trained machine learning model is configured based on a training dataset that is generated by providing image data and drawn A density from a plurality of chip specifications to a simulation software.

5. The method of claim 4, wherein the simulation software is configured to simulate effects of chip manufacturing processes on chip components based on sets of geometries associated with the plurality of chip specifications.

6. The method of claim 1, wherein the first neutral network comprises a convolutional neural network configured to extract the set of image features, and the second neural network comprises a deep neural network configured to determine the silicon density based on the set of image features and the drawn density.

7. The method of claim 1, further comprising adding a halo area to the image for each portion of the plurality of portions to account for the effect of neighboring portions.

8. The method of claim 1, wherein the set of geometries comprises a set of photomasks.

9. The method of claim 1, further comprising adding a plurality of images generated from the plurality of portions to an image training dataset and incorporating the image training dataset into the analytical model.

10. The method of claim 9, further comprising removing identical or similar records from the image training dataset based upon a structural similarity index analysis.

11. The method of claim 1, further comprising, when generating the image for each of the plurality of portions of the layer, using an efficient image construction method based on pixel coordinate values and pixel color values from the set of geometries.

12. The method of claim 1, wherein the image for each of the plurality of portions corresponds to a two-dimensional representation of the set of geometries for that portion, and wherein different geometries are represented in different visual styles.

13. A system comprising one or more processors configured to:
    receive a specification for a chip, the specification specifying a set of geometries associated with a layer of the chip, wherein the set of geometries are associated with a plurality of components;
    generate an image for each of a plurality of portions of the layer based on the geometries;
    calculate a drawn density for the plurality of components within each of the plurality of portions;
    for each of the plurality of portions, use an analytical model to predict a component silicon density of the plurality of components for that portion based on the image and the drawn density for that portion; and
    determine a silicon density for the layer based on a plurality of predicted component silicon densities for the plurality of portions;
    wherein the analytical model comprises a first software module comprising a first neural network configured to extract a set of image features from the image, and a second software module comprising a second neural network configured to determine the silicon density based on the set of image features and the drawn density.

14. The system of claim 13, wherein the analytical model comprises a trained machine learning model that is configured to execute the first software module and the second software module.

15. The system of claim 13, wherein the first neural network comprises a convolutional neural network configured to extract the set of image features, and the second neural network comprises a deep neural network configured to determine the silicon density based on the set of image features and the drawn density.

16. The system of claim 13, wherein the one or more processors are further configured to add a halo area to the image for each portion of the plurality of portions to account for the effect of neighboring portions.

17. The system of claim 13, wherein the one or more processors are further configured to, when generating the image for each of the plurality of portions of the layer, use an efficient image construction method based on pixel coordinate values and pixel color values from the set of geometries.

* * * * *